Figure 1:
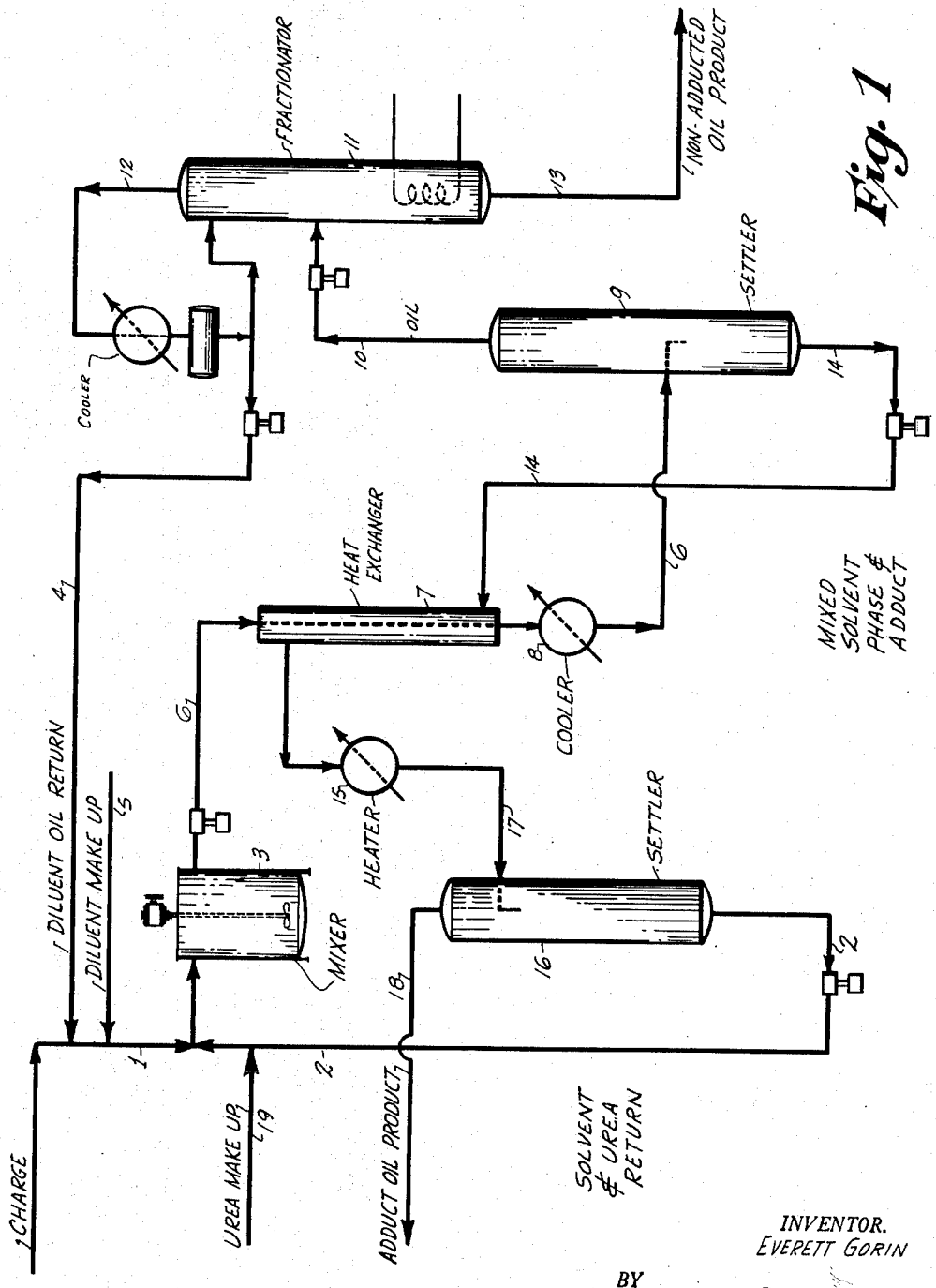

June 15, 1954            E. GORIN            2,681,337

TRIETHYLAMINE AS A SOLVENT IN UREA COMPLEX FORMATION

Original Filed Jan. 29, 1948            2 Sheets-Sheet 1

INVENTOR.
EVERETT GORIN
BY
Robert D. Flynn
AGENT

June 15, 1954     E. GORIN     2,681,337
TRIETHYLAMINE AS A SOLVENT IN UREA COMPLEX FORMATION
Original Filed Jan. 29, 1948     2 Sheets-Sheet 2

INVENTOR.
EVERETT GORIN
BY
AGENT

Patented June 15, 1954

2,681,337

UNITED STATES PATENT OFFICE 2,681,337

TRIETHYLAMINE AS A SOLVENT IN UREA COMPLEX FORMATION

Everett Gorin, Pittsburgh, Pa., assignor to Socony-Vacuum Oil Company, Incorporated, a corporation of New York Original application January 29, 1948, Serial No. 4,997. Divided and this application February 14, 1952, Serial No. 271,467

4 Claims. (Cl. 260—96.5)

This invention is concerned with the separation of hydrocarbons and hydrocarbon derivatives of different molecular configuration.

Numerous processes have been developed for the separation of hydrocarbons of different molecular configuration by taking advantage of their selective solubility in selected reagents from which they may later be separated. The Edeleanu process, separating paraffinic materials from aromatics by virtue of the greater solubility of the latter in liquid sulphur dioxide is exemplary, as are lubricant oil solvent refining processes, solvent deasphalting, solvent dewaxing and the like.

This invention is concerned with the general field outlined above, but based upon a different phenomenon, namely, the differing ability of hydrocarbon materials to enter into and to be removed from, certain crystalline complexes.

This invention is based upon the knowledge that urea will form complex crystalline compounds, known as adducts, to a varying degree with various forms of hydrocarbons and hydrocarbon derivatives. Hydrocarbons of less than seven carbon atoms, highly branched hydrocarbons, and aromatic hydrocarbons either do not form adducts or do not form them at conditions where other hydrocarbons form them readily. Normal straight chain hydrocarbons of seven or more carbon atoms form adducts most readily. This ability extends through many of the olefine compounds, and through most of the compounds derived from hydrocarbons by substitution of a simple functional group for a hydrogen attached to one of the terminal carbon atoms such as halides, amides, nitriles, etc. Among such compounds, and among associated hydrocarbons, the adducts are formed with different degrees of readiness, and selective adduct formation offers a method for the separation of hydrocarbons and hydrocarbon derivatives of different molecular configurations.

The object of this invention is the provision of a method of separation by formation of urea adducts which method is continuous in nature, flexible, capable of effecting relatively sharp separation, and not highly demanding of attention and of utilities such as heat, refrigeration, pumping power, and the like.

The invention utilizes as its functional reagent a solution of urea. This solution should range from nearly saturated to supersaturated at the temperature at which it is contacted with the hydrocarbon mixture, and, in many cases, it will be found convenient to suspend a further supply of urea crystals in the solution, handling it as a slurry. The solvent, physically, should be of such a specific gravity that after the formation of a desired amount of urea adduct, the specific gravity of the solvent phase will be different from that of the adduct phase and of the residual oil phase to a degree sufficient to permit separation by gravity, centrifuging, etc. Chemically, the solvent should be inert to the oil and to urea, and it should be incapable of dissolving any significant proportion of either the adduct-forming ingredient of the hydrocarbon mixture or the non-adducted ingredients. It should be heat stable, both alone and in contact with urea, at temperatures at which the desired adduct is not heat stable. These requirements being met, the solvent may be either single component or multi-component, it usually being convenient to utilize a two-component system, as water and an alcohol, or a glycol and water.

Such a solvent, carrying urea in amounts near to or above saturation lends itself readily to a continuous process for separation by urea-adduct formation. Such a process may be used for the removal of n-hydrocarbons and derivatives of n-hydrocarbons such as primary alcohols, amines, and halides, and straight chain aldehydes, nitriles, acids, etc., from mixtures containing one or more of these classes of compounds.

The primary step of such a process would be the contacting of the hydrocarbon mixture with the solution of urea, under controlled conditions. Taking for exemplary purposes a hydrocarbon mixture composed of n-hydrocarbons and iso-hydrocarbons, the n-hydrocarbons originally present will combine with the urea to form a solid crystalline complex. The contacting will be so conducted as to result first in a mixed phase containing non-adducted hydrocarbon, adduct complex of n-hydrocarbons and urea, and urea solution. This mixture passes continuously into a separating zone wherein phase separation takes place, with solution and adduct separating from non-adducted oil. Preferably, solvent and conditions will be so selected that the adduct phase is heavier than the solvent phase, which in turn is heavier than the oil phase. Then, the mixed phase may be introduced into the solvent phase in the separator, whereby oil phase particles rising through the solvent phase are stripped of n-hydrocarbons by further adduct formation and adduct complex, falling through the solvent phase is freed to a large extent of non-adducted oil. Non-adducted oil may be withdrawn from the top of the settling vessel, and adduct and solvent may be withdrawn from the bottom. The mixture of adduct and solvent is then heated, resulting in dissolution of the adduct complex, with return of urea to the solvent phase. After phase separation, the adduct oil, substantially pure n-hydrocarbon, may be withdrawn, and the solvent phase, with its urea, returned to the original mixing step.

Figure 2:
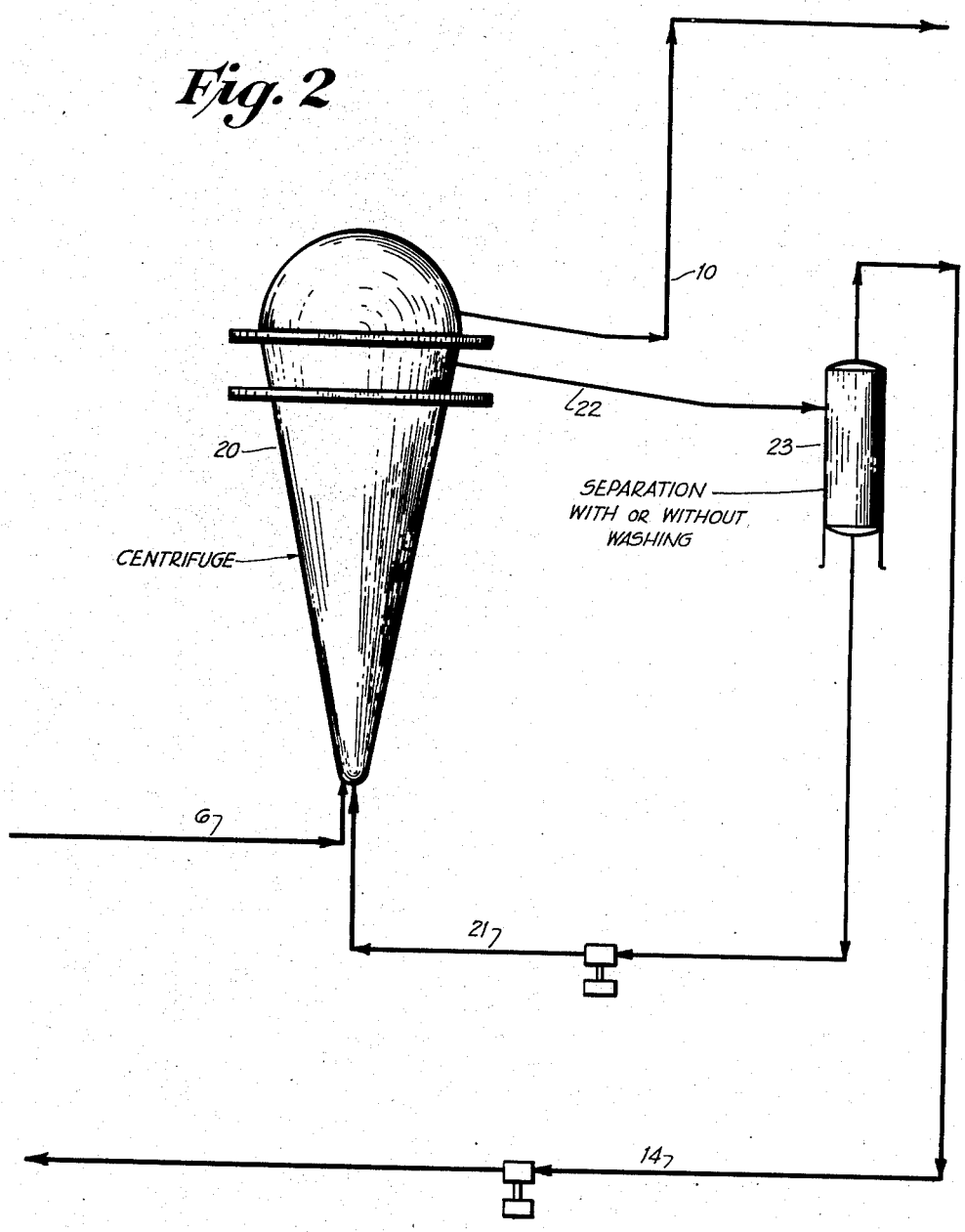

In order that this invention may be more readily understood, reference is now made to the drawings attached hereto, the Figure 1 of which sets forth in diagram form, the process here described, and Figure 2, likewise in diagram form, presents a modification of a portion thereof.

In the drawing, charge oil enters through pipe 1, to be contacted with urea solution from pipe 2, and the two are intimately mixed in mixer 3. In case the oil undergoing treatment is rather viscous at the temperature of adduct formation, it is advisable to provide a diluent, such as, for example, a naphtha cut, which may be recycled within the process, as described later, and joins the charge oil from pipe 4. Diluent makeup is provided by pipe 5.

From mixer 3, wherein there is achieved an intimate mixture of urea solution and charge oil, the mixture flows through pipe 6, heat exchanger 7, and cooler 8 into settler 9. There may be some or a good portion of adduct formed in mixer 3, but in general, it is preferred to operate 3 at a temperature somewhat above that conducive to heavy formation of adduct. Then, in heat exchanger 7, the temperature of the mixture is reduced, and in cooler 8 adjusted, so that the desired adduct is formed. It will be recognized that this showing is diagrammatic, and that the heat exchangers and coolers, heaters, etc., shown will be of any type suitable, as determined by the physical characteristics of the materials being handled.

From cooler 8, the adduct-containing mixture flows into settler 9. This settler is preferably so managed that there is an upper phase of non-adducted oil, an intermediate phase of urea solution, and a lower region containing a slurry of adduct in the urea solution. The incoming mixture is preferably introduced into the solution phase, so that non-adducted oil may move upward, and adduct downward, through some little distance in the solution, to permit adequate separation of adduct from oil and oil from adduct.

The non-adducted oil will be removed from settler 9 by pipe 10 and introduced into fractionator 11, wherein the diluent is removed, to pass overhead by vapor pipe 12 and eventually return to use through pipe 4. Recovered non-adducted oil passes from the system through pipe 13. Obviously if no diluent be used, fractionator 11 will be dispensed with.

Adduct and urea solution, withdrawn from settler 9 through pipe 14 are passed through heat-exchanger 7 and heater 15 to enter settler 16 through pipe 17. In this operation, the temperature is so adjusted that the adducted oil is freed from the adduct complex, and in settler 16, the adducted oil rises to the top, to be removed from the system by means of pipe 18. The urea solution, thus reconstituted to its original condition by return to it of that portion of the urea which passed into adduct, is withdrawn from settler 16 by pipe 2 and returned to process. Obviously, in a process of this kind there are minor mechanical and entrainment losses of reagent, etc. and reagent makeup is provided for by pipe 19.

In many cases, the separation of adduct and solution from non-adducted oil may be conducted with greater facility in a centrifuge operation. Such a setup is shown in Figure 2, wherein only the equivalent of that portion of Figure 1 centering around settler 9 is reproduced. Again, in diagram form, I find the cooled mixture containing non-adducted oil, adduct and urea solvent entering by pipe 6 to which it is delivered to a centrifuging operation shown diagrammatically by 20. In many cases it will be desirable to utilize a carrier liquid in known manner in this operation and that liquid may be introduced by pipe 21. Non-adducted oil will be carried off by pipe 10, and adduct, solvent, and carrier, if present, pass through 22 to a separation step, which may include washing and may be carried out in a settler, a filter, or another centrifugal operation, which separation is indicated diagrammatically at 23. Carrier liquid, if used, returns through pipe 21, and solvent and adduct depart through pipe 14. (Note: Pipes 6, 10, 14 are the same pipes, for the same functions, as in Figure 1 and are identically numbered.)

As an example of operation according to the above process there is set forth the separation of a viscous petroleum fraction of the nature of a wax distillate. The charge stock in this case was a fraction of 30.5° API gravity. This was mixed with a methanol-urea reagent having a ratio by weight of 1.58 parts of methanol to 1.0 part of urea. The reagent was applied in the proportions of 1.99 volumes of methanol to 1 volume of charge oil. No diluent naphtha was used in this case. Upon being cooled to about 43° C. an adduct was formed, which adduct was separated in the solvent adduct phase and found to be heavy enough to sink therein, resulting in separation of non-adducted oil from a solvent-adduct phase in the manner shown. The non-adducted oil, recovered, was found to be of 27.9° API gravity and to amount to about 57% of the original charge oil. The adduct was then heated sufficiently to set free a portion of the adducted oil. This first portion set free was found to have an API gravity of 32.3° and to amount to about 18.9% of the original charge oil. The remaining adduct was heated to free the rest of the adducted oil. The second portion was found to have an API gravity of 37.6° and to amount to about 16.5% of the original charge oil. In this operation, conducted upon a small scale, about 7.4% of the oil remained unaccounted for.

In more general terms, operations of this kind may be conducted in the apparatus and method described, as follows. A waxy distillate oil enters through pipe 1 and is admixed with from 30% to 150% by volume of a light straight run naphtha. Entering from pipe 2 is a warm urea solution, the solvent of which is a mixture of methanol with between 5 and 40% by volume of water. This solution contains sufficient urea so that after giving up the desired amount of urea to adduct formation, it will still be substantially saturated. It enters at a temperature sufficiently high to enable it to carry this amount of urea.

The two solutions are intimately admixed in mixer 3, the effluent therefrom being of the nature of an emulsion. While passing through heat exchanger 7 and cooler 8, the "emulsion" is chilled to a temperature of from +10° C. to +25° C., the degrees of chilling being determined by the extent of adduct formation desired. If necessary, and it sometimes may be desirable, additional time for adduct formation may be provided for by lengthening the time spent in chiller 8 or by providing a stirred "time" tank in pipe 6 between chiller 8 and settler 9. Frequently, it is advisable to change the sequence of items 3, 7 and 8. It may be advisable to cool before mixing, or to partially cool before mixing, particularly when long mixing times or long residence times to insure completion of adduct formation are necessary.

The mixture of oil, solvent, and adduct passing into settler 9 separates, as described, into oil and adduct-solvent slurry. The oil, withdrawn at 10, is fractionated to drive off diluent naphtha which returns to service. Non-adduct oil, in this case a wax distillate freed to a greater or less extent of wax, is removed at 13.

Adduct and solvent, withdrawn at 14, are heated in exchanger 7 and heater 15 to a temperature at which the "wax" (n-paraffin hydrocarbons) will break from the adduct complex. This temperature will be of the order of from 45° C. to 80° C., depending upon the nature of the adducted hydrocarbon. The solvent and the molten "wax" separate one from another in settler 16, and the "wax" is withdrawn at 18, while the reconstituted solution of urea returns to use through pipe 2.

In the above discussion the term "wax" is used to indicate the gross nature of the adducted hydrocarbons. Its exact nature, and the extent to which it corresponds to commercial wax or slack wax depends upon the amount removed, i. e., depth of adduction, as influenced by amount of urea present and temperature of adduct formation.

Usually, the "wax" will contain a certain amount of naphtha and smaller amounts of unadducted oil which were occluded in the adduct. It contains in addition lower molecular weight n-paraffins in the $C_{17}-C_{23}$ range which melt below the commercial wax range. The naphtha and low molecular weight waxes may be removed by fractional distillation. The quality of the wax residue will be in direct proportion to the ease with which the occluded oil was removed from the adduct before it was decomposed.

Dependent upon the amount and nature of the urea reagent used, the nature of the urea solvent, the temperature of adduct formation and separation, the specific gravity of the non-adducted oil, whether or not a diluent of low specific gravity has been added to lighten the non-adducted oil, and possibly other factors, the specific gravity of the adduct, of the solvent phase, and of the non-adducted oil phase will vary. The adduct will normally be heavier than the non-adducted oil phase, but may be lighter than the solvent phase and in most cases experimental trial of solvent, solvent concentration, temperature, etc., will be necessary to establish proper conditions for handling any given charge oil according to this system, although once determined, such conditions will be found readily reproducible.

The amount of solvent used, and the concentration of urea therein, are based upon the following: (1) The solution should be close to saturation at the temperature of exit from cooler 8. The solution should be sufficient in volume to carry, without being far from saturation at the temperature of settler 16, the urea which has entered into the desired adduct and is removed therefrom in 16. The amount of urea present in desired adduct complexes, and likewise the amount present in saturated solutions in various solvents, at various temperatures will vary from case to case and will of necessity be determined by experimentation for each particular case.

Within broad limits the proportioning of solvent to charge oil may be based upon the degree of adduct formation desired, as follows: The adducted oil, i. e., that withdrawn from the system at pipe 18, should be of the order of from about 2% to about 12% by volume of the amount of urea solution withdrawn from settler 16 by pipe 2. This proportion is in reality determined by the physical nature of the slurry withdrawn at pipe 14 from settler 9. It should be as concentrated as possible, for economic reasons if for no other, but at concentrations of adduct above those indicated the slurry tends to become thick and difficult to handle. Here again, conditions vary from operation to operation, and optimum conditions are best determined by experimentation.

The temperature to which the mixture is cooled depends upon the molecular weight range of the n-paraffins being separated. Thus in the $C_7-C_9$, $C_{10}-C_{14}$, $C_{15}-C_{20}$ and $C_{20}+$ ranges the preferred temperatures are within the ranges $-10$ to $+10°$ C., $0-20°$ C., $10-25°$ C., and $20-35°$ C. respectively.

The conditions desirable for a solvent can be met in most cases by using a mixed solvent containing water, and an organic liquid which is miscible with water such as an alcohol, glycol, amine or diamine preferably a lower aliphatic alcohol such as methanol or ethanol, or an aliphatic amine such as piperidine.

A number of urea solvents that may be advantageously employed in this process have already been mentioned. The use of mixed solvents is generally preferred although in certain cases the use of single-component solvents is advantageous. In particular, the lower aliphatic alcohols, methanol and ethanol, may be used as single-component solvents when treating hydrocarbon stocks having average molecular weights above about 210-240. The use of these solvents has the advantage that the formation of the urea complex takes place much more rapidly than when aqueous urea solvents are used. However, when treating viscous oils where it is necessary to use naphtha diluents to reduce the viscosity of the oil, one encounters difficulty due to solubility of the naphtha in the methanol solvent. The n-paraffins recovered in this case are contaminated with naphtha which must be removed by fractional distillation. Stocks having molecular weights below about 200 cannot be treated advantageously with a single aliphatic alcohol solvent, due to the high solubility of the oil in the alcohol.

Other single-component solvents may be employed although they are generally not as important as the lower aliphatic alcohols. Glycols may be employed as single solvents although ethylene glycol itself is not suitable due to the high density of the urea-saturated solvent. The higher glycols and particularly the butylene glycols may be advantageously employed. Diamines such as diamino-ethane, -propane and -butane may likewise be employed. The solvents that are generally useful when mixed with sufficient water, ethylene glycol or ethylene diamine, to render them substantially insoluble in the oil being treated, are selected from the class of alcohols such as methanol, ethanol, propanol, etc., ethers such as ethylene glycol dimethyl ether; and amines such as triethyl amine, piperidine, etc. The mixed solvent is preferably subject to the restriction that the density after saturation with urea must be less than 1.0–1.1.

This method may be applied to the separation of a wide variety of straight chain compounds from technical mixtures containing branched and cyclic compounds.

(a) N-paraffins in the range of $C_7$–$C_{30}$ and higher may be separated from straight run naphtha, virgin kerosenes and gas oils, wax distillates, foots-oil, etc.

(b) N-paraffins and n-olefins may be separated from hydrocarbon mixtures prepared by synthesis from carbon monoxide and hydrocarbons, i. e., from typical Fischer-Tropsch products prepared using cobalt and iron catalysts. N-olefins, and particularly normal 1-olefins, may be separated from cracked mixture prepared by the vapor phase cracking of stocks rich in n-paraffins, such as by the cracking of paraffinic gas oils, foots-oil, crude waxes of various types, etc.

(c) Straight chain oxygenated compounds such as acids, alcohols, aldehyde and esters may be separated from technical mixtures also containing the branched compounds, such as those derived by synthesis from carbon monoxide and hydrogen over an iron catalyst or by oxidation of high molecular weight hydrocarbons.

(d) A mixture consisting essentially of n-paraffins and n-olefins can be split into one fraction enriched in n-paraffins and the other enriched in n-olefins by this process, due to the fact that the n-paraffins form a stronger complex with urea than the n-olefins.

(e) A mixture consisting essentially of n-olefins with the double bond in various positions can be split into a fraction enriched in olefins having the double bond near the end of the chain, due to the fact that these olefins form a stronger complex with the urea than those having the double bond further from the end of the chain.

Some bench scale experiments illustrating various characteristics of the process applicable to industrial applications after the method disclosed are as follows:

Example I

Ten cc. of methanol saturated with urea was agitated at room temperature with 2 cc. of a mixture containing 50 vol. per cent of triisobutylene and 50 vol. per cent of n-tetradecene-1. The mixture was poured into 35 cc. of methanol saturated urea and allowed to settle. The complex settled out leaving a clear supernatant liquid. No upper layer of triisobutylene was formed. The solubility of triisobutylene in methanol saturated with urea was tested in a separate experiment and found to be 5 vol. per cent. The solubility of olefins in this molecular weight range in methanol is therefore too high for this solvent to be used successfully.

Example II

Ten cc. of urea solvent containing 15.4 vol. per cent of $H_2O$ saturated urea and 84.6 vol. per cent of methanol saturated urea was agitated with 2 cc. of a mixture containing 50 vol. per cent of triisobutylene and 50 vol. per cent of n-tetradecene-1. A heavy white precipitate of the urea-tetradecene complex was formed. The mixture was poured into 35 cc. of the urea-saturated solvent described previously. The urea complex settled out to form 19 cc. of a slurry of the complex in the urea solvent, while 0.3 cc. of triisobutylene settled out on top. The slurry of complex was removed from the supernatant liquid and decomposed by heating to 45° C. One cc. of relatively impure tetradecene was recovered as a top layer. The solubility of the triisobutylene in the solvent is still too high to allow a complete separation between the normal and branched olefins to be made.

Example III

Fifteen cc. of urea solvent consisting of 34 vol. per cent of water-saturated urea and 66 vol. per cent of methanol-saturated urea containing 2 grams of suspended solid urea was agitated with 2 cc. of a 50 vol. per cent mixture of triisobutylene and tetradecene-1. The resulting mixture was poured into 20 cc. of the above urea solvent and the whole mixture centrifuged for 1 minute. The centrifuged mixture was separated into an upper layer containing 21.5 cc. of clear urea solvent plus 1.1 cc. of an insoluble oil which contained about 90% of triisobutylene. The lower layer, consisting of 13.9 cc. of a slurry of the urea-tetradecene complex in the urea solvent, was heated to 55° C. wherein the complex dissolved to form a clear solution and liberate 0.9 cc. of substantially pure tetradecene as a top insoluble layer.

Example IV

Thirty cc. of a urea solvent consisting of 56.0 vol. per cent of water-saturated urea and 44 vol. per cent of a methanol-saturated urea containing 2 grams of solid urea was agitated with 2 cc. of a 50 volume per cent mixture of triisobutylene and tetradecene-1. The mixture was centrifuged, but the urea tetradecene complex is apparently lighter than the urea solvent and remains on top mixed with the triisobutylene.

Example V

The same experiment was repeated using pure water-saturated urea as a solvent. The complex was again lighter than the solvent and remained on top when the mixture was centrifuged.

The densities of the solvents used in Examples I through V were 0.86, 0.91, 0.96, 1.03 and 1.15 respectively. These examples illustrate the critical nature of the density of the solvent in determining whether separation between the upper oil layer and the urea complex can be effected in a gravitational or centrifugal field of force.

Another experiment was carried out to illustrate the use of aqueous amines as solvents for the urea.

Example VI

A solution containing 65 vol. per cent of piperidine and 35 vol. per cent of water was saturated with urea. A mixture of 35 cc. of this solution was agitated at 25° C. for ten minutes with 6 grams of solid urea and 6 cc. of a solution containing 50 vol. per cent of triisobutylene and 50 vol. per cent of n-tetradecene-1. The resulting mixture containing the tetradecene complex in suspension was centrifuged. The clear upper layer was removed and found to contain 8.9 cc. of the urea solvent and 3.3 cc. of an oil which contained nearly all of the original triisobutylene plus about 15 vol. per cent of the original tetradecene. The lower layer was heated to 55° C. whereupon the complex was completely decomposed forming a clear liquid containing 2.5 cc. of oil as an upper layer. The oil layer was separated and washed with water to remove the small amount of dissolved piperidene. The water-washed oil was found to be substantially pure tetradecene.

The separation of n-paraffinic constituents from selected cuts of paraffinic crudes is illustrated by the following example.

*Example VII*

Ten grams of solid urea was suspended in 100 cc. of a urea solvent containing 34 vol. per cent of water-saturated urea and 66 vol. per cent of methanol-saturated urea. The above mixture was agitated at room temperature with 20 cc. of a 180–200° C. fraction from a Michigan crude oil. The resulting slurry was centrifuged and the top clear layer consisting of 12 cc. of oil and 23 cc. of the urea solvent was removed.

The slurry composing the bottom layer was heated to 60° C. to give a clear liquid containing 6 cc. of an oil layer and 71.0 cc. of the recovered urea solvent. The oil layer was rich in n-paraffins.

It will of course be understood that this process will admit of considerable variations in charge material, solvent for urea, urea concentration in solvent, ratio of solution to charge, temperature of adduct formation, temperature of adduct breaking, and the like, and all such are contemplated as being within the invention subject only to limitations expressed in the claims.

Since the method is useful for a wide variety of purposes, such as, for example separation of the acidic and/or alcoholic or other products of hydrocarbon oxidation from non-oxidized hydrocarbons, it will be recognized that the term, "mixture containing hydrocarbon materials" embraces such mixtures, and also mixtures containing products of halogenation, amination, and the like, as well as mixtures resulting from isomerization, alkylation, dehydrocyclization, dehydrogenation, etc., which later are embraced in the more restricted term "petroleum hydrocarbon mixture."

This application is a division of application Serial No. 4,997, filed January 29, 1948.

I claim:

1. In a process for the separation of straight chain hydrocarbons from their mixture with non-straight-chain hydrocarbons, which comprises contacting the mixture with an aqueous solution of urea so as to form crystalline molecular complexes of urea with straight-chain hydrocarbons and separating the complexes from non-straight-chain hydrocarbons, the improvement which comprises so contacting the said mixture and the said aqueous solution in the presence of triethylamine.

2. In a process for the fractionation of a mixture containing straight-chain organic compounds and branched-chain organic compounds, said original mixture being free of triethylamine, wherein said mixture is contacted with an aqueous solution of urea to form crystalline molecular complexes of urea-straight-chain compounds and said complexes are separated from remaining organic compounds, the improvement which comprises dissolving said mixture in triethylamine and thereafter so contacting the resulting solution containing the said original mixture with said aqueous solution of urea.

3. In a process for the fractionation of a mixture containing straight-chain and branched-chain hydrocarbons wherein said mixture is contacted with an aqueous solution of urea so as to form crystalline complexes of urea-straight-chain hydrocarbon complexes and said complexes are separated from remaining hydrocarbons, the improvement which comprises so contacting the said mixture and the said aqueous solution in the presence of triethylamine.

4. In a process for the fractionation of a mixture containing straight-chain and branched-chain organic compounds, said original mixture being free of triethylamine, wherein said mixture is contacted with an aqueous solution of urea so as to form crystalline complexes of urea-straight-chain organic compound complexes and said complexes are separated from remaining organic compounds, the improvement which comprises so contacting the said mixture and the said aqueous solution in the presence of triethylamine.

References Cited in the file of this patent

UNITED STATES PATENTS

| Number | Name | Date |
|---|---|---|
| 2,520,715 | Fetterly | Aug. 29, 1950 |
| 2,560,193 | Shoemaker | July 10, 1951 |
| 2,569,984 | Fetterly | Oct. 2, 1951 |
| 2,578,054 | Fetterly | Dec. 11, 1951 |